2,838,557

METHOD OF PREPARING ALKALI AND ALKALINE EARTH METAL SALTS OF DITHIOPHOSPHORIC ACID DIESTERS

Guy M. Verley, Harvey, Ill., assignor to Sinclair Refining Company, New York, N. Y., a corporation of Maine No Drawing. Application March 28, 1956
Serial No. 574,369

4 Claims. (Cl. 260—461)

This invention relates to lubricating oil additives, and more particularly to an improved method for preparing the alkali and alkaline earth metal salts of diesters of dithiophosphoric acid.

It is generally known that the addition of oil-soluble metal salts of esters of dithiophosphoric acid, such as the zinc, calcium or barium salts, to lubricating oils imparts various desirable properties thereto, including increased resistance to oil oxidation and bearing corrosion, as well as some detergent or sludge dispersive properties. Furthermore, as indicated by the prior art, various methods have heretofore been proposed for preparing these oil-soluble metal salts by neutralizing the free acid ester with a metal-containing basic reagent such as a hydroxide, carbonate, or oxide of the alkali or alkaline earth metals to obtain the phosphorus-containing metal salt. Frequently, such methods include, for example, the direct reaction between the free acid and an alkaline earth metal oxide in an alcohol-benzene solution or the direct reaction between a metal hydroxide, such as barium hydroxide, and the free acid in a mineral oil solution with the removal of liberated water of neutralization by means of air blowing. Other known methods of preparing the metal salts include reacting the free acid with zinc oxide or zinc hydroxide at temperatures ranging from 70° F. to 170° F., or reacting the free acid with a caustic soda solution in the presence of water to precipitate the alkali metal salt.

In spite of the variety of methods proposed for preparing the metal salts of esters of dithiophosphoric acid, particularly the alkali and alkaline earth metal salts, the conventional methods of preparation have given products of unsatisfactory purity and frequently of decreased oil solubility, thereby limiting their efficiency in the improvement of lubricating oils. This inability to prepare the metal salts in the desired purity is believed due mainly to the occurrence of three side reactions. For example, in a conventional method of preparing the calcium salt of a dilauryl dithiophosphoric acid ester obtained by reacting lauryl alcohol with phosphorus pentasulfide, it was found that frequently an oxygen atom will be substituted for the double bonded sulfur atom attached to the phosphorus atom with evolution of hydrogen sulfide, thus effecting a decrease in the anti-oxidant properties of the material. This reaction is accelerated by the presence of strong bases and may be extensive at room temperature. Other side reactions which may occur include the hydrolysis of an ester group and a disproportionation reaction whereby the dibasic monoester dithiophosphoric acid, formed by hydrolysis of an ester group, picks up the metal from the salt of the acid diester to give the free acid and a dibasic salt which usually precipitates out of solution. This latter reaction may explain why, for example, a calcium salt of dithiophosphoric acid which contains the calculated amount of calcium required to neutralize the monobasic acid would remain acid, or when not dried properly, turn acid upon standing. This reaction is particularly detrimental to the production of acceptable lubricating oil additives since strong acid is liberated and since the salts of corresponding dibasic acids are not oil soluble unless the alkyl group contains about 14 carbon atoms or more.

By means of the present invention it is now possible to obtain the alkali and alkaline earth metal salts of diesters of dithiophosphoric acid in a manner which eliminates or minimizes the above-mentioned side reactions and thus effects a product of improved purity having good oil solubility. The metal salts produced by the method of this invention are characterized by being substantially neutral and are particularly useful as oxidation inhibitors and anti-wear agents for the improvement of lubricating oils such as motor oils, diesel engine oils and the like.

In general, the present invention applies to the neutralization of organic-substituted acids of phosphorus in which the organic portion attached to the acid radical is susceptible to attack, decomposition, rearrangement or substitution in the strong basic medium usually employed for neutralization by the alkali and alkaline earth metals. The present invention comprises minimizing and preventing the degradation of the organic radical while, at the same time, completing the neutralization by a medium of progressively stronger alkalinity controlled by proper choice and stepwise addition of organic ionizing agents and inorganic compounds containing the alkali or alkaline earth metals.

In accordance with my invention the oil-soluble alkali and alkaline earth metal salts of diesters of dithiophosphoric acid are obtained by partially neutralizing the acid with an alkali or alkaline earth metal carbonate in the presence of an alkylene glycol and in a substantially anhydrous medium, i. e. essentially the water present is that produced in the neutralization reaction. These carbonates include the bicarbonates as well as the divalent carbonate salts. The neutralization is then driven near completion by the addition of an oxide or hydroxide of the same alkali or alkaline earth metal previously employed in the partial neutralization step. Thereafter, if it is desired to ascertain complete neutralization of the small percent of free acid sometimes remaining, and particularly when an acid number of near zero is required, a minor amount of a low molecular weight alcohol containing, e. g. 1 to 3 carbon atoms, can be added near the completion of the reaction to furnish a stronger ionizable medium found necessary for complete neutralization. During the reaction of the oxide or hydroxide the medium is again substantially anhydrous although a small amount of water may be added as with the low molecular weight alcohol.

In practicing the present invention partial neutralization is carried out in the presence of a small amount of a suitable inert neutralization promoter or solvent such as diethyl carbitol which provides an ionizable medium for the esters of dithiophosphoric acid and the basic alkali or alkaline-earth metal materials. The neutralization promoter is generally used in a range of about 0.005 to 0.2 part by weight per part of acid ester, and preferably is about 0.02 part by weight. Other promoters which may be employed in the partial neutralization step include alkylene glycols having a molecular weight of up to about 300 in which the alkylene radical contains 2 to 4 carbon atoms. These glycols include the lower alkylene glycols, e. g. ethylene glycol and propylene glycol, and the mono and polyethers of the glycols. The preferred glycols have molecular weights between about 100 to 200.

In addition to the neutralization promoter, it is often convenient to carry out both steps of the neutralization in the presence of an inert organic solvent which reduces the viscosity of the acid-ester and affords better control of the reaction. The solvent may be a light mineral oil or hydrocarbon solvent such as a gasoline fraction, hexane, benzene, toluene, kerosene or the like, and is usually employed in a range of about 0.2 to 5 parts by weight per part of acid ester, and preferably about 1 part by weight.

The acid diesters which may be neutralized by the method of this invention include a wide variety of dithiophosphoric acid esters conventionally prepared by reacting a sulfide of phosphorus, such as phosphorus pentasulfide, with an alcohol, a mixture of two different alcohols, phenols or mercaptans. The organic compound containing the hydroxyl group, reacting with phosphorus sulfide to form the diester-dithiophosphoric acid, may also contain additional groups or elements such as ether or sulfone linkages, nitro group, chlorine or sulfur atoms and similar substituents.

In general, the hydroxyl-containing materials used in preparing the diester dithiophosphoric acids in the present invention contain up to about 20 carbon atoms. I employ those of 4 to 20 carbon atoms in making oil-solution products, but lesser carbon atom-containing sources can be used in making oil-insoluble salts which can be employed, for instance, as flotation agents. Useful alcohols include primary alcohols such as 2-methyl pentanol-1, decanol, hexadecanol, and the like, and secondary alcohols such as cyclohexanol, methyl cyclohexanol and the like. Other hydroxyl-containing materials which can be reacted with the phosphorus sulfide include phenols and alkylated phenols. When desiring to make acids of higher sulfur content, the hydroxyl material may be replaced by the corresponding mercaptan.

Neutralization of the acid esters may be carried out over a relatively wide temperature range, such as from about 35° F. to 300° F., although I have found that best results are obtained when operating within a range of about 100 to 150° F.

Preparation of the metal salts contemplated by this invention is effected by first reacting the acid ester with a carbonate or bicarbonate of the desired alkali or alkaline earth metal such as, for example, lithium carbonate. The amount of metal carbonate employed generally ranges from about 0.1 to 1.0 times the theoretical amount required to neutralize the acid ester as calculated from the equivalent weight thereof or as measured by titration and in a preferred embodiment, the dithiophosphoric acid ester is reacted at room temperature with about 0.5 equivalent of the desired metal carbonate to effect partial neutralization of the acid ester. The neutralization is then driven to near completion by the addition of from generally about 0.5 to 1.5 equivalents (based on the acid ester) of an oxide or hydroxide of the same alkali or alkaline earth metal previously utilized to effect partial neutralization, e. g. lithium hydroxide. Preferably, about 1 equivalent of the metal oxide or hydroxide is added step-wise to the reaction mixture with care being exercised so as to maintain a temperature of about 100 to 150° F. during the exothermic reaction. The reactants are heated at this temperature for about two hours with agitation, after which the acidity of the liquid phase is determined by any convenient means of measuring pH.

As previously mentioned, when carrying out the above described neutralization of the acid material, the crude product obtained after reaction with the metal oxide or hydroxide may have a pH ranging from 5.5 to 6.5 in ASTM D-974 solvent. Consequently, if it be desired that the neutralization of the acid ester proceed to completion, a small amount of methanol, usually about .01 to 1.0 part by weight based on the weight of the acid ester, and preferably about 0.1 part by weight, is added to the mixture near the completion of the reaction to effect neutralization of the small amount of free acid remaining. In preparing the alkaline earth metal salts of the acid esters the methanol will ordinarily contain up to about 10% by weight of water. Although methanol is the preferred solvent used to furnish the stronger ionizable medium subsequent the addition of the metal oxide or hydroxide, other polar solvents containing less than 4 carbon atoms, such as ethanol and isopropanol, may also be employed. After the neutralization is complete the mixture is filtered and the solvent removed by stripping under reduced pressure. The product thus obtained is a substantially neutral, colorless metal salt of the dithiophosphoric acid ester.

The following examples illustrate the advantages in the method of preparing the alkali and alkaline earth metal salts of diester-dithiophosphoric acid in accordance with this invention.

EXAMPLE I

A di-lauryl-dithiophosphoric acid ester was prepared in a conventional manner by reacting a technical grade of lauryl alcohol with phosphorus pentasulfide. This acid, nearly colorless, analyzed:

Percent phosphorus _____ 6.12
Percent sulfur _____ 12.2
Acid number _____ 105.2

After dilution with an equal weight of a light mineral oil, the acid ester solution was used in Examples II–IV.

EXAMPLE II

*Preparation of calcium salt*

To one part of the diluted acid ester of Example I was added 0.01 part of water, then 1.2 equivalents of calcium hydroxide in one hour at 140–160° F. The reaction mixture was stirred one hour longer at 180° F., heated to 275° F. one hour to dehydrate, and was filtered. There was obtained an oil-soluble salt. Analysis:

Theoretical:
    Calcium, percent _____ 1.92
    Phosphorus, percent _____ 3.00
    Sulfur, percent _____ 6.00
    Acid number _____ 0
Found:
    Calcium, percent _____ 1.46
    Phosphorus, percent _____ 3.03
    Sulfur, percent _____ 5.80
    Acid number (ASTM D-974) _____ 27

EXAMPLE III

The preparation of Example II was made with a large excess, i. e. 5 equivalents of calcium hydroxide and a partially neutralized greenish salt was obtained which analyzed:

Calcum, percent _____ 1.01
Phosphorus, percent _____ 2.99
Sulfur, percent _____ 5.79
Acid number _____ 35.3

EXAMPLE IV

To one part of the acid ester as prepared in Example I were added 0.02 parts methanol and portionwise 2 equivalents of calcium hydroxide at 130–140° F. in three hours. The reaction mixture was heated at 180° F. for one hour and then at 275° F. for an additional hour to remove excess methanol. A greenish viscous product was obtained containing: Calcium, 1.97%; phosphorus, 3.01%; and sulfur, 5.63%; acid number 22.9. The product contained the theoretical amount of calcium but free acidity amounted to about 43% of the original acidity. Upon standing a gel-like whitish material deposited from the oil.

The partially neutralized salt was recontacted with 1 equivalent of calcium oxide in the presence of 1% methanol and 1% water. After heating for 4 hours at 180° F., a highly viscous salt was obtained. Analysis: Calcium, 2.16%; phosphorus, 3.00%; sulfur, 5.28%; acid number 17.1; free acid 32% of the original.

Preparations of Examples II, III and IV which can be called conventional methods of making salts of strong acids failed to give a neutral salt and contained free acid amounting to 30 to 70% of the original acidity.

EXAMPLE V

A neutral, colorless calcium salt was made by the method of the invention as follows. To one part of the acid-ester as prepared in Example I was added 0.02 part of diethylcarbitol and 0.5 equivalent of calcium carbonate. The mixture was stirred at room temperature for 30 minutes during which time the acid became partially neutralized with formation of calcium bicarbonate.

The neutralization was driven to near completion by step-wise addition of 1 equivalent of calcium oxide. Heat was evolved and the calcium oxide was added at a rate to maintain a temperature of 100 to 140° F. Upon completion of the addition of calcium oxide, the reactants were stirred for 2 hours at 140° F. Acidity was then checked by commercial pH paper.

The product gave a slightly acid reaction and 0.1 part of methanol containing 10% water was added; after stirring 10 minutes the reaction mixture was neutral. A substantially neutral calcium salt in oil solution was obtained after filtering and stripping the small amount of solvent at reduced pressure which analyzed:

Theoretical.—Percent P, 3.00; percent Ca, 1.94; percent S, 5.92; acid No. 0. Found.—Percent P, 3.00; percent Ca, 1.92; percent S, 5.9; acid No. (D–974) 0.3.

The same preparation was repeated while using benzene solvent instead of mineral oil to obtain a product which analyzed as follows:

Theoretical.—Percent P, 5.90; percent S, 11.8; percent Ca, 3.8; acid No. 0.0. Found.—Percent P, 5.92; percent S, 11.6; percent Ca, 3.7; acid No. (D–974) 0.5.

EXAMPLE VI

*Preparation of lithium salt*

A di-2-ethylhexyldithiophosphoric acid was made by reacting 5% excess of 2-ethylhexanol with phosphorus pentasulfide by a conventional method.

*Analysis.*—Theoretical: percent P, 8.8; percent S, 18.1; acid No. 160. Found: percent P, 8.8; percent S, 18.0; acid No. (D–974) 159.

Attempts to make the lithium salt by conventional methods failed to yield the desired salt, as illustrated below.

EXAMPLE VII

One part of diester dithiophosphoric acid prepared as in Example VI was dissolved in 1 part toluene containing 1% water. Lithium hydroxide (1.1 equivalents) was added portionwise with good stirring at 100° F. The water was removed by taking off the toluene-water azeotrope. A small amount of undissolved material was separated by filtration and the toluene was stripped from the reaction product at 10 mm. Hg pressure up to 150° F. pot temperature. When about 90% of the toluene was removed, the product gelled suddenly and upon stripping the remaining solvent, a voluminous white precipitate formed. The gel-precipitate was oil-insoluble and analyzed: percent P, 11.70; percent S, 13.80; percent Li, 7.0.

EXAMPLE VIII

A substantially neutral lithium salt was obtained by following the method of the present invention. To 1 part of di-2-ethylhexyldithiophosphoric acid diluted in 1 part of benzene, 0.02 part of diethylcarbitol and 0.5 equivalent of lithium carbonate were added. After stirring at room temperature for 30 mintues, 1 equivalent of dry lithium hydroxide was added step-wise in one hour to maintain the temperature at 100–110° F. Stirring was continued 2 hours at 110° F., then 0.1 part methanol was added and 10 minutes afterwards the product was neutralized. After filtering and topping the solvents a clear, nearly colorless, viscous liquid was obtained analyzing:

Theoretical.—P, 8.62%; S, 17.81%; Li, 1.93%; acid No. 0. Found.—P, 8.61%; S, 17.18%; Li, 1.84%; acid No. 1.2.

EXAMPLE IX

*Preparation of barium salt*

Diethylcarbitol 35 g. (0.05 part) and benzene 300 g. (0.42 part) were added to 709 g. (1 part) of di(2-ethylhexyl) dithiophosphoric acid prepared by the conventional method. Barium carbonate 100 g. (0.5 equivalent) was added portionwise at 140–170° F. in 30 minutes and the mixture stirred for 1 hour at this temperature. Barium oxide 150 g. (1 equivalent) was then added slowly (1 hour) at 140° F. and the mixture stirred 1 hour after complete addition. The pH was 6.3 and 70 g. methanol (0.1 part) added at once. Five minutes afterwards the pH had increased to 7.8; the methanol together with some benzene was stripped at 20 mm. Hg. The residue was filtered and remaining solvent was topped. I obtained 97% of the theoretical yield of barium salt which analyzed:

Calculated.—percent S, 15.1; percent Ba, 16.2; percent P, 7.3; acid No. 0.0. Found.—percent S, 15.1; percent Ba, 16.3; percent P, 7.4; acid No. 0.3.

I claim:

1. In a method of preparing the alkali and alkaline earth metal salts of dithiophosphoric acid diesters by neutralizing the acid ester in an essentially anhydrous medium, the steps which comprise partially neutralizing said acid ester with about 0.1 to 1.0 equivalent of a carbonate of a metal selected from the alkali and alkaline earth metals, and in the presence of about 0.005 to 0.2 part by weight of a material selected from the group consisting of alkylene glycols of up to about 300 molecular weight in which the alkylene radical contains 2 to 4 carbon atoms and the ethers thereof, further neutralizing the acid ester by adding about 0.5 to 1.5 equivalents of a member selected from the group consisting of the oxides and hydroxides of the alkali and alkaline earth metals.

2. The method of claim 1 wherein about .01 to 1.0 part by weight of a low molecular weight alcohol containing 1 to 3 carbon atoms are added after addition of said member of the group of oxides and hydroxides.

3. The method of claim 2 in which the alcohol is methanol.

4. The method of claim 1 wherein said ether of the alkylene glycol is diethyl carbitol.

References Cited in the file of this patent

Cheronis: "Organic Chemistry," 6th ed., Thomas Y. Crowell Co. (1947), New York, N. Y., page 419.